United States Patent [19]
Sandman et al.

[11] Patent Number: 6,094,861
[45] Date of Patent: Aug. 1, 2000

[54] VEGETABLE GROWING APPARATUS

[76] Inventors: Alan Sandman, 15 Secor Dr., Port Washington, N.Y. 11050; Harry Alex Meltzer, 7 Brook Bridge Rd., Great Neck, N.Y. 11021

[21] Appl. No.: 09/166,646

[22] Filed: Oct. 5, 1998

[51] Int. Cl.[7] .................................................. A01G 9/02
[52] U.S. Cl. .................................................. 47/67; 47/83
[58] Field of Search ........................... 47/1.7, 65.5, 65.6, 47/67, 71, 82

[56] References Cited

U.S. PATENT DOCUMENTS

| | | | |
|---|---|---|---|
| 226,922 | 4/1880 | Moses | 220/212 |
| D. 352,480 | 11/1994 | Carlson | 47/79 |
| 517,085 | 3/1894 | Wheat | 312/31.01 |
| 620,150 | 2/1899 | Kitchen | 47/66.1 |
| 3,079,037 | 2/1963 | Schechter | 220/212 |
| 4,691,473 | 9/1987 | Ragen | 47/67 |
| 5,315,783 | 5/1994 | Peng | 47/65.6 |
| 5,333,409 | 8/1994 | Mendes | 47/67 |

*Primary Examiner*—Peter M. Poon
*Assistant Examiner*—Francis T. Palo
*Attorney, Agent, or Firm*—Lilling & Lilling P.C.

[57] ABSTRACT

The object of the invention is to provide a method and device for the growing of tomatoes and other vegetables out from the bottom of a container suspended above ground thereby eliminating the conventional problems routinely associated with home gardening. In particular, the device allows gardening in a space efficient manner without having to routinely weed and water the plant soil. A drip well in the top of the container provides a constant source of moisture and suspension of the container above ground eliminates the threat of ground borne insects and small animal pests without the use of pesticides and repellents.

20 Claims, 2 Drawing Sheets

VEGETABLE GROWING APPARATUS

FIELD OF THE INVENTION

This invention relates to the home gardening industry and, in particular, to a device suspended above ground for growing tomatoes and other vegetables upside down.

BACKGROUND OF THE INVENTION

For many years, people have been growing tomatoes and other vegetables in outdoor gardens at the front, side and rear yards of their homes. A persistent problem with garden vegetables, particularly tomatoes, is that the plants take up a substantial amount of outdoor space. Such space requirements are inconvenient and prevent those living in apartments or with limited yard space from enjoying their own home-grown tomatoes and other vegetables.

In order to be successful, vegetable gardens must be kept free from insects and small animal pests. Considerable time and expense must be incurred using pesticides and other means to maintain a healthy garden free from the damaging effects of insects and small animal pests. The risk of insects and pest damage is even greater when trying to grow plants which produce vegetables on or close to the ground. Such a position of the vegetables provides easier access for the many non-flying insects and land borne animals which feed on plants and vegetables. Further, even with proper care, plant and vegetable damage from said pests may occur at any time during the plant life. Therefore, there is always a need in the home gardening industry for new and inventive methods for decreasing the risk of plant damage, especially without the use of environmentally harmful pesticides and animal repellents.

In addition to the risk of insects and small animal pests, significant time and expense must be expended to keep a vegetable garden free of weeds. Many back breaking hours may be spent throughout the growing season picking weeks that continuously plague a garden. Failure to regularly maintain a garden free of weeds will decrease the health and productivity of the plants. Weed growth within the garden may also increase the chance of insect infection.

Another difficulty with the growing of vegetables, particularly tomatoes, is that many individual plants must be tied up with stakes or chicken wire. The vegetables must be kept from lying on the ground in order to prevent rot due to soil moisture and attack from non-flying insects and small animals. As the plants continue to grow throughout the season, they must continuously be retied to prevent the plants from lying on the ground as they grow.

Finally, a vegetable garden must be watered regularly to maintain plant health. Such need is especially important during the dry season at the end of the summer months. As a result, substantial time must be put aside on a regular basis to water the garden but a gardener must also be mindful of the risk of over-watering the plants.

Therefore, there is a need in the market place for a simple, space efficient way to grow tomatoes and other vegetables without the hassle of stakes, or the considerable time and expense needed to keep a garden free of insects, animals and weeds.

SUMMARY OF THE INVENTION

It is the object of this invention to provide a simple, easy to use device for growing tomatoes and other vegetables without the conventional difficulties routinely involved in home gardening. The invention comprises a container which when filled with potting soil, may be suspended by a handle from any porch ceiling, balcony, fire escape, eave, garage, shed and/or fence. The container has an opening in its base allowing the vegetable plant to grow out of the bottom portion of the container upside down. A tray insert covers the soil exposed inside the top portion of the container preventing the growth of weeds within the container and/or the drying of the soil through direct exposure to sunlight. In addition, a well or reservoir will be formed between the tray insert surface and the rim of the container. This well will be filled with water, which seeps into the soil in a regulated fashion through tiny holes in the tip of a plurality of cones extending downward from the tray insert into the soil. Such a watering system limits the need for regular watering and maintains optimum moisture levels within the plant soil. Further, the tray insert keeps the plant soil covered from sunlight thereby effectively preventing the unwanted growth of weeds or the need of regular weeding. The device allows the plant to grow suspended upside down eliminating the ground space ordinarily required to grow vegetables. Thus, a person living in an apartment with a balcony and/or fire escape or in a house with a small outside deck or yard is able to grow healthy tomatoes and other vegetables and enjoy a home garden. The suspended device keeps the plants above and away from the ground. In this way, the risk from ground borne insects and small animal pests is eradicated, thereby eliminating the needed time and expense to combat such threat in an affordable and environmentally safe fashion. Further, the device eliminates the need and expense of plant stakes or chicken wire. The suspended plant is able to grow freely above ground without the risk of falling over or breaking. In this way, the work and effort to regularly tie up the plant as it grows, to keep it above the ground and to prevent the rot of tomatoes and other vegetables lying upon the ground, is completely eliminated.

DETAILED DESCRIPTION OF THE INVENTION

Figure 1:
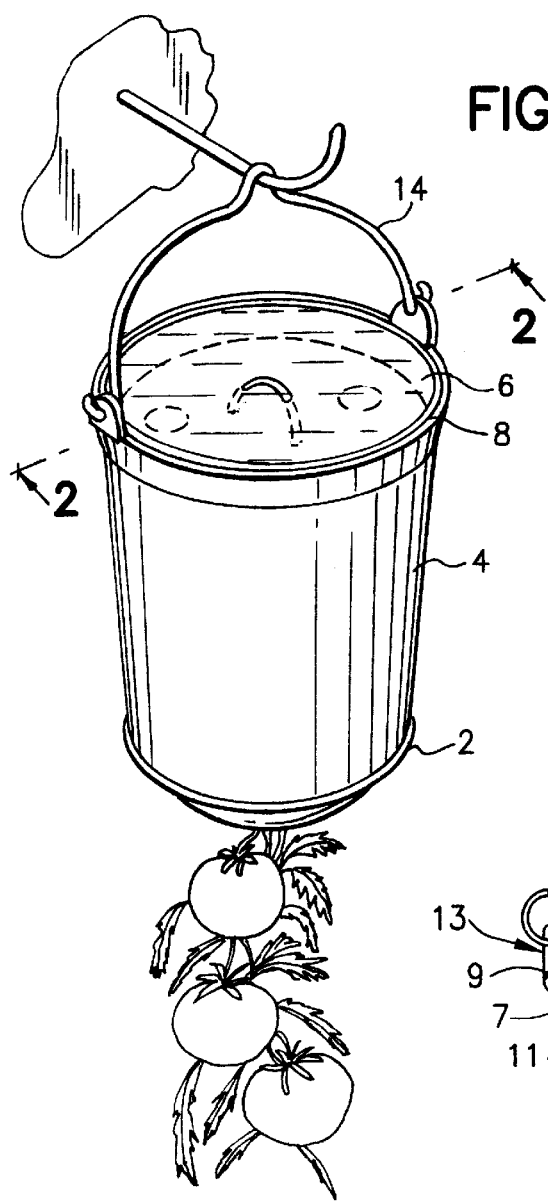
FIG. 1 is a perspective view of the container.
Figure 2:
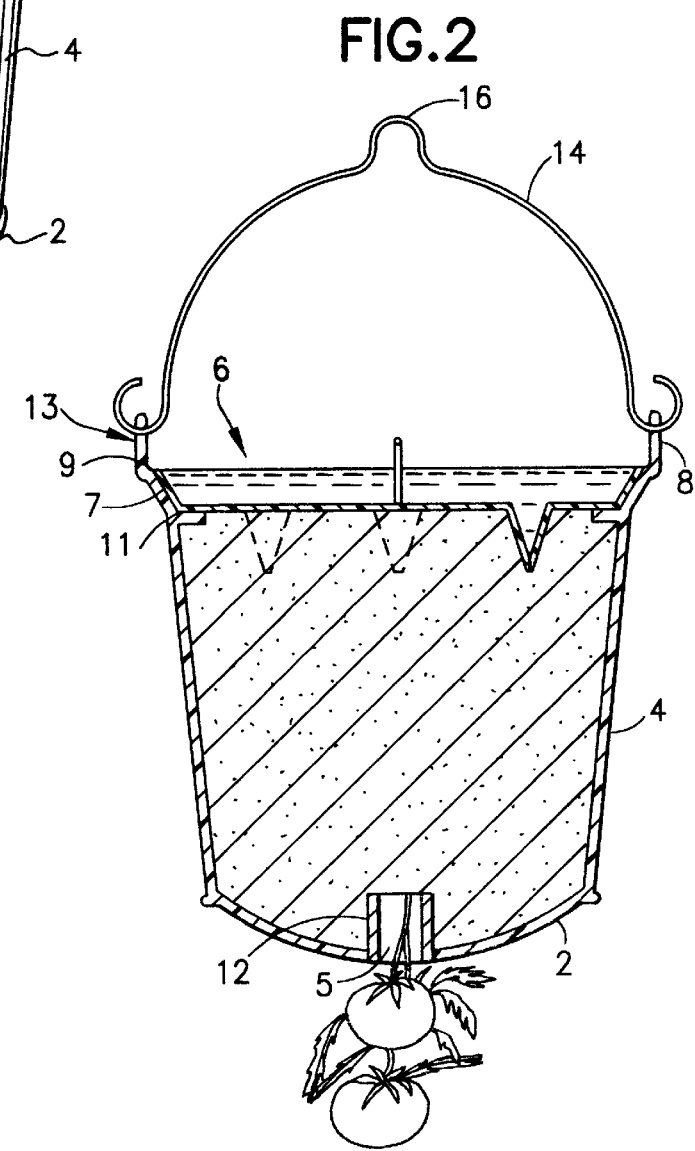
FIG. 2 is a cross section view of container.
Figure 3:
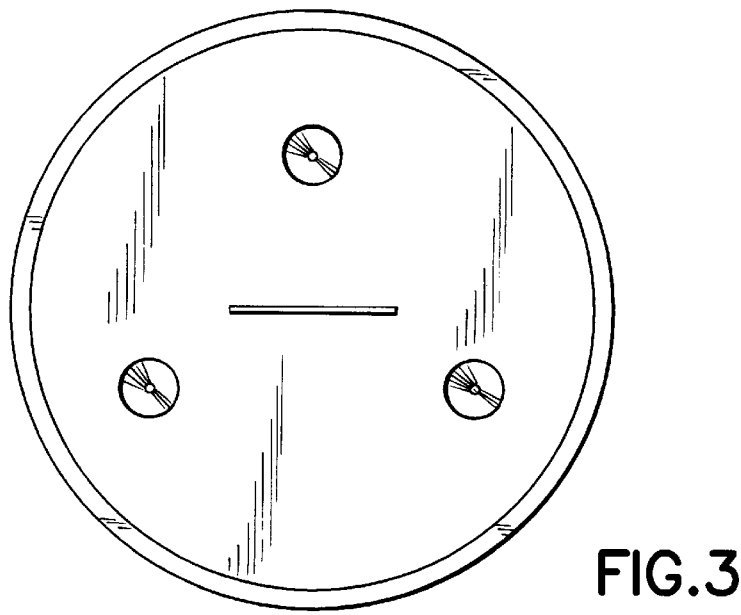
FIG. 3 is a top view of the tray insert.

The invention comprises a container with a base 2, body 4 and an open top 6 surrounded by a lip 8 for holding potting soil which may be suspended above the ground by means of a handle 14. Said container has a centered aperture 5 in the base 2 allowing the plant to grow out from the bottom of the container in a downward vertical direction. Further, said container contains a uniform border 7 below the lip 8 containing a top 9 and bottom 11 portion. The border is of uniform height around the entire circumference of said container. The top portion 9 of the border has a diameter larger then the bottom portion 11 such that an angle is formed outward from the body.

Preferably, the container is made of a light galvanized metal with a zinc coating to prevent rust. It may, however, be made from any strong and sturdy material such as ceramics, plastics and/or other metals. Any material that has sufficient strength to securely hold the soil may be used.

The size of the container and the aperture 5 may vary depending on the size and type of plant grown. Further, the amount of soil within the container may vary accordingly.

On the inside of the container a metal stem 12 extends upward from the base 2. The metal stem 12 surrounds the aperture 5 in the container base 2 thereby creating a reservoir. When water is placed in the container it will seep through the soil to the container base 2, filling the reservoir. The reservoir is filled when the water level rises above the metal stem and thereby exits through the aperture in the base of the container. In this way, a controlled amount of water will remain in the base 2 of the container keeping the soil moist. Further, the aperture 5 prevents over-watering by allowing excess water to exit the base of the container.

A handle 14 is attached to the container to provide a means to suspend the container above the ground. The handle may be attached to the container in either a fixed or movable position by means of a slip joint or pivot 13. Further, the handle 14 may contain a loop or hook 16 to facilitate the suspension of the container.

Preferably, the handle is made of a strong galvanized metal with a zinc coating to prevent rust. It may, however, be made from any strong and sturdy material such ceramics, plastics and/or other metals. Any material that has sufficient strength to securely hold the combined weight of the container, soil and plant, may be used.

The means of suspension, will depend upon the size and shape of the handle 14 and/or hook 16.

Figure 4:
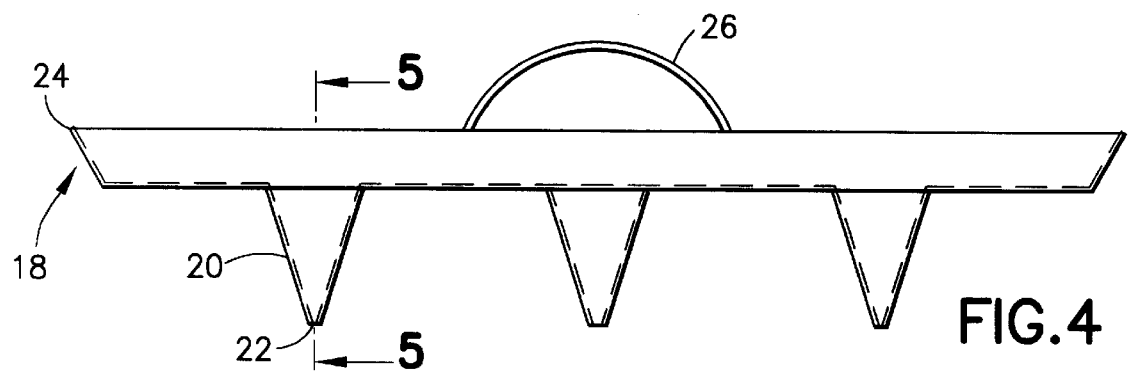
FIG. 4 is a front view of the tray insert.
Figure 5:
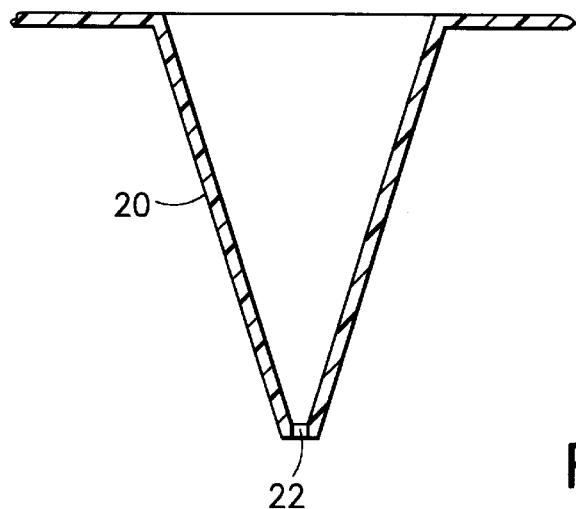
FIG. 5 is the cross section view of a tray insert cone.

A tray insert 18, as seen in FIG. 4, covers the exposed soil in the top portion of the container and may be made of any lightweight suitable material such as plastic or metal with a zinc coating to prevent rust. Said tray insert 18 contains a plurality of hollow cones 20 where the larger open end joins the tray insert surface and the pointed end of the cone extends downward away from the tray insert. Each cone 20 contains a small opening 22 in its tip. In this way, water placed in the top portion of the container will fill the cones 20 and slowly permeate the soil through the openings 22 in the tips of the cones. The flow of liquid through the tips of the cones 20 can be controlled by varying the size of the openings at the cone tip. In some embodiments, the length and diameter of the cones may vary depending on plant size and type.

Additionally, the tray insert contains a uniform rim 24 around the outer circumference of said tray insert. Said rim 24 is of a uniform height and forms an acute angle between the rim and the top surface of the tray insert such that the diameter of the rim is greater than that of the top of the tray insert. The angle formed is similar in degree to the acute angle formed by the border 7 of the container and the pedicle to the container body 4. In this way, when the tray insert 18 is placed into position at the top of the container, said rim 24 rests evenly on the border and prevents the tray insert from sliding downward into the container.

A curved pull 26 is attached to the top of the tray insert. In this way the user may easily lift or implant the tray insert 18 into said container.

The tray insert 18 further serves the function of covering the soil within the container from exposure to direct sunlight. In this way, weeds are unable to infiltrate and grow in the plant soil thereby eliminating the need for regular weeding.

By blocking soil exposure to sunlight, the tray insert also prevents the drying out of the soil due to evaporation. Thus the need for regular watering is decreased and continuous soil moisture increases the health of the plant.

The growing apparatus assembly can be suspended above the ground in various means by attachment to a porch or balcony ceiling, fence, eave overhangs, fire escapes, exterior walls of homes and/or garages and/or outdoor sheds. This allows the vegetable plant to grow outward and downward through the aperture 5 in the base 2 of the container. Due to the position of the plant above ground, the risk of damage due to the many species of ground borne insects and small animal pests is eliminated in an environmentally safe manner with limited time and expense.

Further, the raised position of the apparatus assembly eliminates the large space requirements normally needed to maintain a vegetable garden. In this way, the apparatus assembly provides a convenient, space efficient method for growing tomatoes and other garden vegetables.

To provide the optimum environment for the plant, various potting soils may be provided depending on plant type.

Also contemplated with the invention are water retaining crystals or pellets. The crystals may be mixed within the soil or placed in the well surrounding the stem 12 and the aperture 5 at the base 2 of the container to aid in the maintenance of optimum moisture levels within the soil, thereby enhancing the health of the plant.

In operation, the user would fill the container with potting soil and the water retaining crystals. The tray insert 18 is then placed into the container with the cone tips 22 facing down. By allowing the tray insert to sit flush upon the soil surface the cones 20 penetrate down into the soil. Preferably, the soil fills the container to a point approximately to the bottom of the border 7. Further, when the tray insert 18 is placed upon the border 7 and/or soil surface, a well is created between the top lip of the container and the top of the tray insert. In this way, water may be placed within the well at intermediate periods. The water will slowly permeate the apertures 22 in the tips of the cones 20 thereby maintaining proper moisture levels within the soil for healthy plant growth.

A seedling will be placed into aperture 5 in the base 2 of the container and then soil will be added from the top 6 of the container. The plant stalk grows outward and downward from the centered aperture in the base of the container. In this way, the root system remains in the soil within the container providing the necessary support for the growing plant.

The invention is described in detail with reference to a particular embodiment, but it should be understood that various other modifications can be effected and still be within the spirit and scope of the invention.

We claim:

1. A vegetable growing apparatus for suspension above the ground and for growing a plant downwardly in a vertical plane comprising:

a container having a base, a body and an open top, said plant being positioned within soil packed within said body, and the base having an aperture through the center to permit said plant to grow downward in a vertical plane out from the base of the container;

a border having a top and a bottom portion and arranged around a circumference of the top of said container, the top portion having a diameter larger than the bottom portion to define an angled surface directed outward from the body of said container;

a handle pivotally mounted to the body of said container;

a tray insert having a plurality of hollow tapered cones extending perpendicularly to a surface of said tray insert, the cones having a continuous passage therethrough to permit a metered flow of liquid out through small holes in the tips of the cones and into the soil within said body of said container over a period of time;

means for suspending the vegetable growing apparatus from said handle in a position above the ground; and means for retaining liquid in the base of said container.

2. A vegetable growing apparatus according to claim 1, wherein:

the container includes an elongated stem surrounding the aperture centered within the base of the container, the stem rising up from the base a distance such that a reservoir is created in the base of the container designed to permit a controlled amount of liquid to remain within said container.

3. A vegetable growing apparatus according to claim 1, wherein:

said tray insert includes a rim around the outer circumference of the tray insert.

4. A vegetable growing apparatus according to claim 2, wherein:

said tray insert includes a rim around the outer circumference of the tray insert.

5. A vegetable growing apparatus according to claim 3, wherein:

said rim has a diameter greater then that of the tray insert such that an acute angle is formed between the rim and the top surface of the tray insert.

6. A vegetable growing apparatus according to claim 4, wherein:

said rim has a diameter greater then that of the tray insert such that an acute angle is formed between the rim and the top surface of the tray insert.

7. A vegetable growing apparatus according to claim 3, wherein:

said tray insert includes a curved pull attached to the top surface of the tray insert.

8. A vegetable growing apparatus according to claim 4, wherein:

said tray insert includes a curved pull attached to a top surface of the tray insert.

9. A vegetable growing apparatus according to claim 5, wherein:

said tray insert includes a curved pull attached to a top surface of the tray insert.

10. A vegetable growing apparatus according to claim 6, wherein:

said tray insert includes a curved pull attached to a top surface of the tray insert.

11. A growing apparatus according to claim 1, wherein:

the tray insert is placed in the container creating a well designed to retain liquid between the tray insert surface and the open top to said container.

12. A growing apparatus according to claim 2, wherein:

the tray insert is placed in the container creating a well designed to retain liquid between the tray insert surface and the open top to said container.

13. A growing apparatus according to claim 3, wherein:

the tray insert is placed in the container creating a well designed to retain liquid between the tray insert surface and the open top to said container.

14. A growing apparatus according to claim 4, wherein:

the tray insert is placed in the container creating a well designed to retain liquid between the tray insert surface and the open top to said container.

15. A growing apparatus according to claim 5, wherein:

the tray insert is placed in the container creating a well designed to retain liquid between the tray insert surface and the open top to said container.

16. A growing apparatus according to claim 6, wherein:

the tray insert is placed in the container creating a well designed to retain liquid between the tray insert surface and the open top to said container.

17. A growing apparatus according to claim 7, wherein:

the tray insert is placed in the container creating a well designed to retain liquid between the tray insert surface and the open top to said container.

18. A growing apparatus according to claim 8, wherein:

the tray insert is placed in the container creating a well designed to retain liquid between the tray insert surface and the open top to said container.

19. A growing apparatus according to claim 9, wherein:

the tray insert is placed in the container creating a well designed to retain liquid between the tray insert surface and the open top to said container.

20. A growing apparatus according to claim 10, wherein:

the tray insert is placed in the container creating a well designed to retain liquid between the tray insert surface and the open top to said container.

\* \* \* \* \*